United States Patent
Patil et al.

(10) Patent No.: US 11,188,803 B1
(45) Date of Patent: Nov. 30, 2021

(54) RECTIFIER BACKFLOW REDUCTION VIA BIASING

(71) Applicant: Impinj, Inc., Seattle, WA (US)

(72) Inventors: Amita Patil, Seattle, WA (US); Jay A. Kuhn, Seattle, WA (US); Charles J. T. Peach, Seattle, WA (US); John D. Hyde, Corvallis, OR (US); Jaskarn Johal, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 16/810,892

(22) Filed: Mar. 6, 2020

Related U.S. Application Data

(60) Provisional application No. 62/815,083, filed on Mar. 7, 2019.

(51) Int. Cl.
  *G06K 19/06* (2006.01)
  *G06K 19/07* (2006.01)
(52) U.S. Cl.
  CPC ..... *G06K 19/0723* (2013.01); *G06K 19/0715* (2013.01)
(58) Field of Classification Search
  CPC ........... A61M 5/16831; A61M 2205/52; F04B 43/09; A61B 5/1427
  USPC ............. 235/462.09, 462.26, 462.46, 472.02
  See application file for complete search history.

(56) References Cited

U.S. PATENT DOCUMENTS

| | | | |
|---|---|---|---|
| 5,853,236 A * | 12/1998 | Rogers | A47B 21/06 312/223.6 |
| 5,889,428 A | 3/1999 | Young | |
| 6,075,402 A | 6/2000 | Ghilardelli et al. | |
| 7,167,090 B1 | 1/2007 | Mandal et al. | |
| 7,561,866 B2 | 7/2009 | Oliver et al. | |
| 7,768,406 B1 * | 8/2010 | Peach | H02J 50/001 340/572.7 |
| 7,907,899 B1 | 3/2011 | Oliver | |
| 7,944,279 B1 | 5/2011 | El | |
| 8,244,201 B2 | 8/2012 | Oliver et al. | |
| 8,362,825 B2 | 1/2013 | Bergler et al. | |
| 8,428,515 B1 | 4/2013 | Oliver | |
| 8,687,395 B2 | 4/2014 | El | |
| 9,000,835 B1 | 4/2015 | Peach et al. | |
| 9,886,658 B1 | 2/2018 | Stanford et al. | |
| 10,713,549 B1 * | 7/2020 | Peach | H03K 17/6872 |
| 10,885,417 B1 * | 1/2021 | Stanford | G06K 19/0723 |
| 2005/0130389 A1 | 6/2005 | Yamazaki et al. | |
| 2006/0128345 A1 | 6/2006 | Ootaka et al. | |
| 2006/0197668 A1 * | 9/2006 | Oliver | G06K 19/0701 340/572.4 |
| 2008/0080214 A1 | 4/2008 | Umeda et al. | |
| 2010/0158157 A1 * | 6/2010 | Iwata | H04L 27/06 375/320 |

(Continued)

*Primary Examiner* — Daniel St Cyr
(74) *Attorney, Agent, or Firm* — Hertzberg, Turk & Associates, LLC

(57) ABSTRACT

Backflow in rectifiers may be reduced via biasing. Upon determining that backflow within a rectifier is likely, one or more rectifying elements in the rectifier may be debiased, via analog or digital means. The debiased rectifying elements become less conductive or nonconductive, thereby reducing or preventing backflow. The determination of backflow likelihood may be performed based on a signal to be backscattered or the amplitude-modulated envelope of an incident RF wave, and may be digital or analog in nature.

18 Claims, 8 Drawing Sheets

RFID TAG IC COMPONENTS

(56) References Cited

U.S. PATENT DOCUMENTS

2013/0299593 A1  11/2013  Glidden, III
2014/0093016 A1* 4/2014  Umeda ................... H04B 1/18
                                                375/340

* cited by examiner

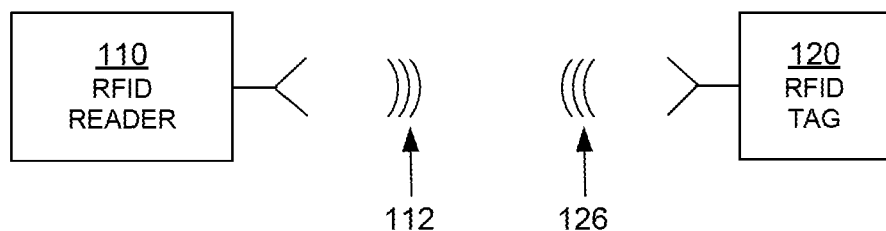
FIG. 1
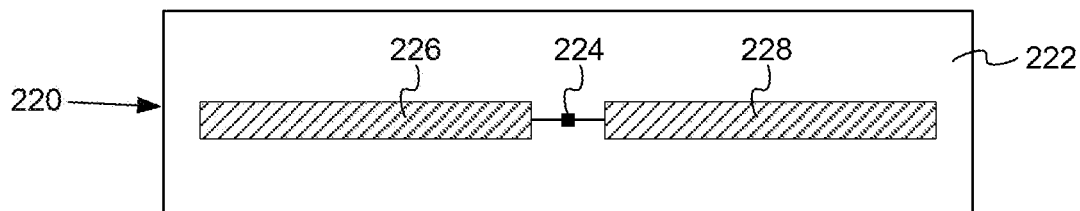
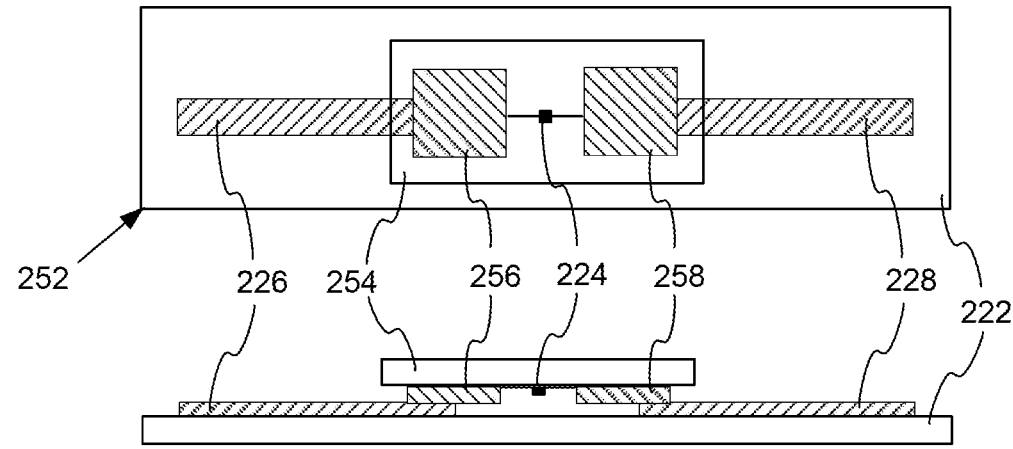
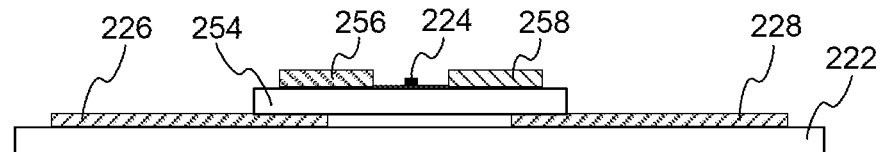
FIG. 2

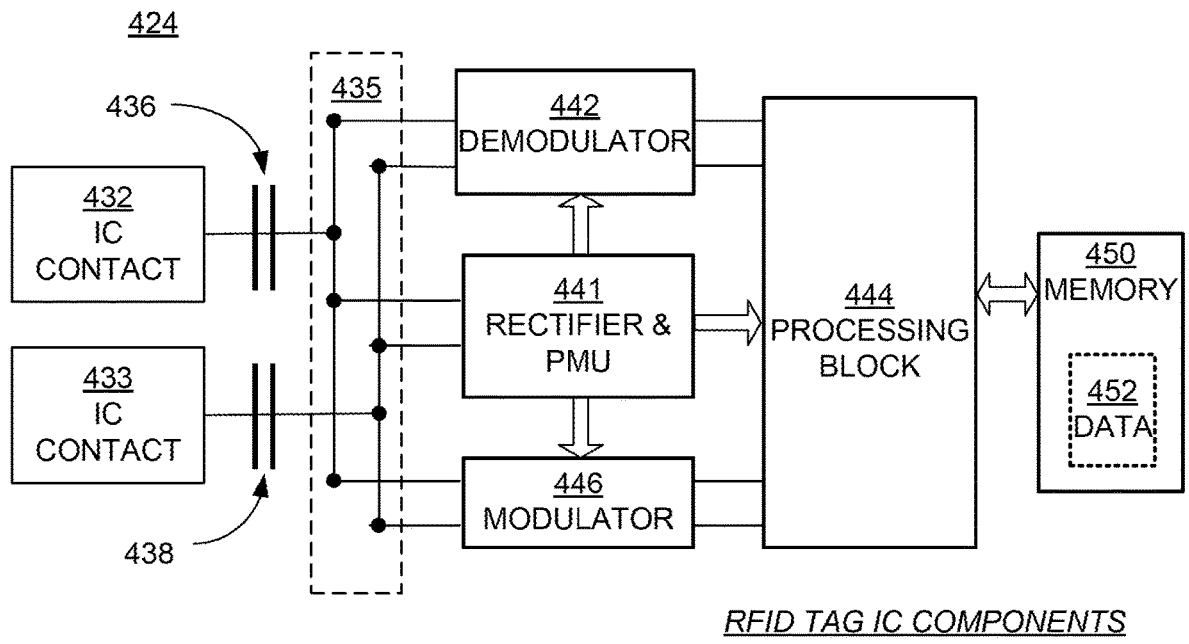
FIG. 4
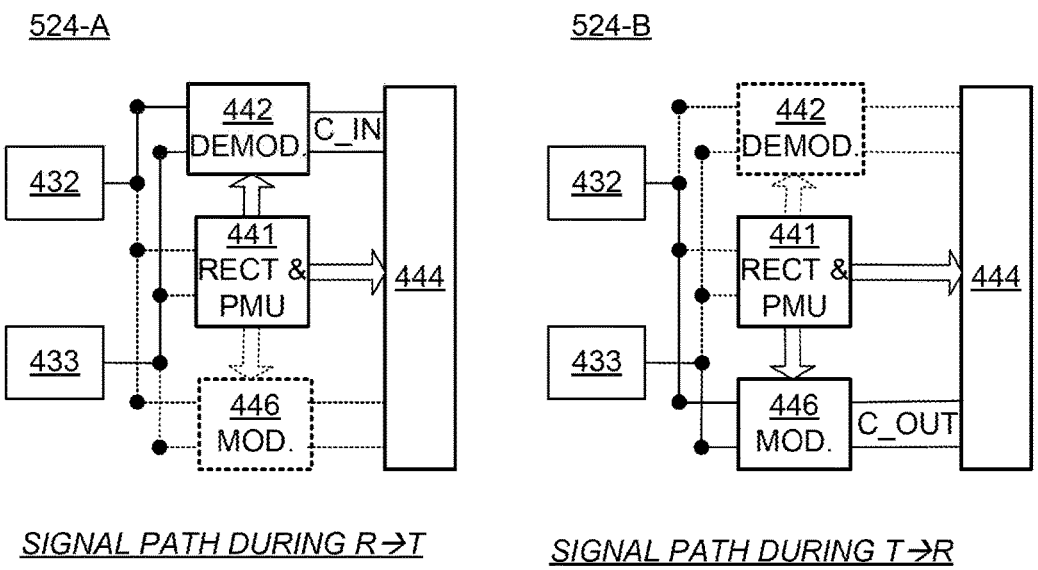
FIG. 5A　　FIG. 5B

RECTIFIER BACKFLOW REDUCTION VIA BIASING

CROSS REFERENCE TO RELATED APPLICATIONS

This application claims the benefit of U.S. Provisional Patent Application Ser. No. 62/815,083 filed on Mar. 7, 2019. The disclosures of the above applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to reducing backflow in rectifiers via biasing. Upon determining that backflow within a rectifier is likely, one or more rectifying elements in the rectifier may be debiased. The debiased rectifying elements become nonconductive or less conductive, thereby reducing or preventing backflow. The determination of backflow likelihood may be performed based on a signal to be backscattered or the amplitude-modulated envelope of an incident RF wave, and may be digital or analog in nature.

According to one example, a Radio Frequency Identification (RFID) integrated circuit (IC) is provided. The RFID IC includes an input node configured to receive an RF signal, a rectifier for rectifying the RF signal and including multiple serially coupled rectifying elements defining a main current path, and a processor block. The processing block is configured to determine RF signal amplitudes and provide a debiasing voltage to debias at least one of the rectifying elements when a first amplitude of the RF signal indicates that rectifier backflow along the main current path is likely, thereby reducing a conductivity of the at least one rectifying element. The processor block is further configured to subsequently reverse the debiasing of the at least one rectifying element when a second amplitude of the RF signal indicates that backflow along the main current path is no longer likely.

According to another example, a Radio Frequency Identification (RFID) integrated circuit (IC) is provided. The RFID IC includes a rectifier configured to extract power from an incident RF signal, an envelope detector configured to determine incident RF signal amplitudes, and a processor block. The processor block is configured to receive a first RF signal amplitude from the envelope detector, determine that the first RF signal amplitude is below a backflow threshold, and in response debias at least one rectifying element in the rectifier to decrease a conductivity of the at least one rectifying element, thereby reducing backflow in the rectifier. The processor block is further configured to, subsequently, receive a second RF signal amplitude from the envelope detector, determine that the second RF signal amplitude is above the backflow threshold, and in response reverse the debiasing of the at least one rectifying element in the rectifier to increase the conductivity of the at least one rectifying element.

According to a further example, a method to reduce backflow in a Radio Frequency Identification (RFID) integrated circuit (IC) rectifier is provided. The method includes determining that a first value of an incident RF wave amplitude is below a threshold and in response debiasing at least one rectifying element in the rectifier to reduce a conductivity of the rectifying element, thereby reducing backflow in the rectifier while the RF wave amplitude is below the threshold. The method further includes subsequently determining that a second value of the RF wave amplitude is above the threshold and in response reversing the debiasing of the at least one rectifying element to increase the conductivity of the rectifying element.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
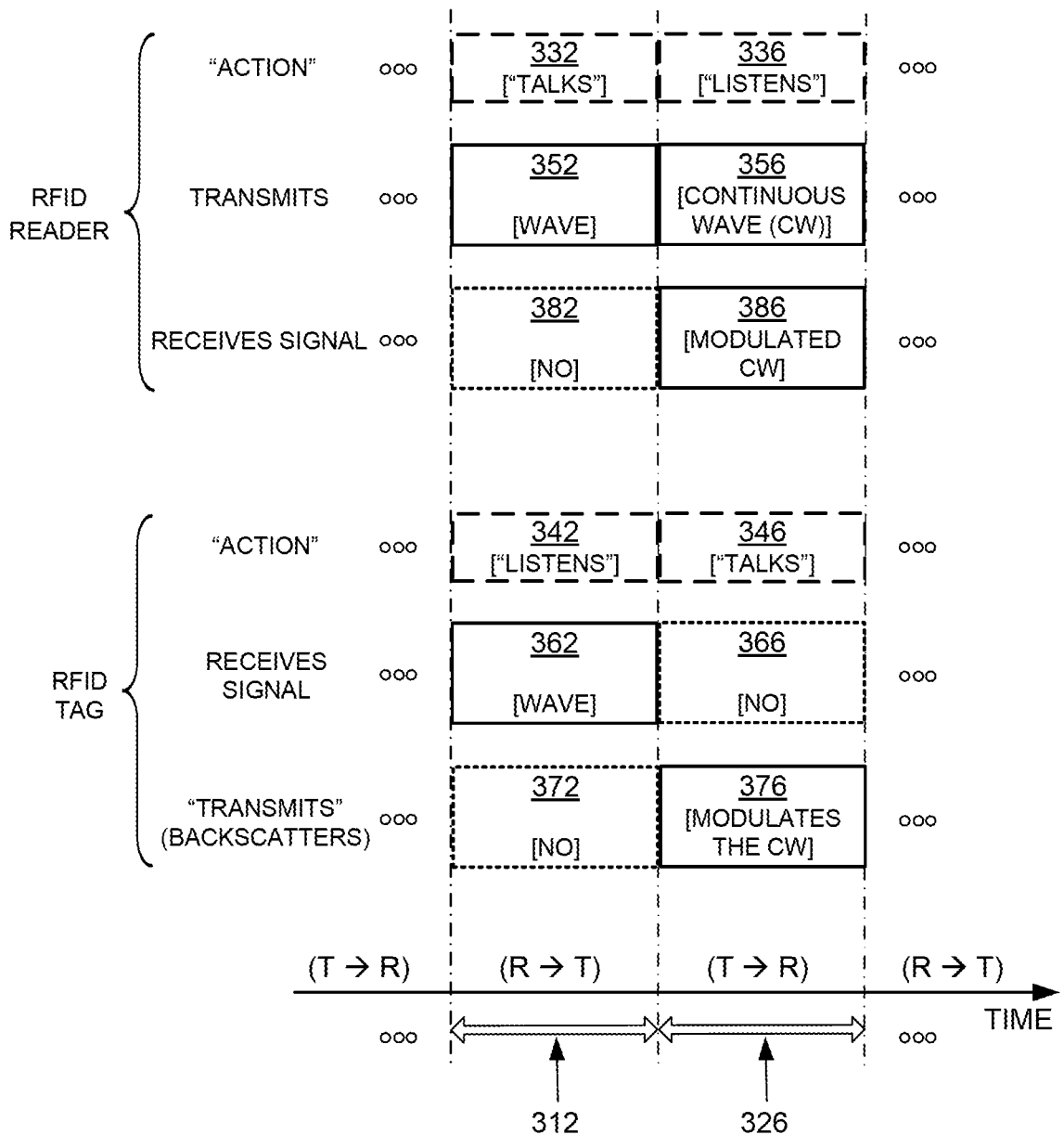
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions, and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Protocol"), versions 1.2.0 and 2.0 of which are hereby incorporated by reference.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHz, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. The antenna may be flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 listens (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically-conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 424 during either or both reader-to-tag (R→T) and tag-to-reader (T→R) intervals. Rectifier and PMU 441 may be implemented in any way known in the art, and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452, and may be at least partly implemented as a nonvolatile memory (NVM) configured to retain data 452 even when circuit 424 does not have power. Processing block 444 may be configured to read data from and/or write data to memory 450.

Modulator 446 generates a modulated signal from the output signal generated by processing block 444. In one embodiment, modulator 446 generates the modulated signal by driving the load presented by antenna segment(s) coupled to IC contacts 432/433 to form a backscatter signal as described above. In another embodiment, modulator 446 includes and/or uses an active transmitter to generate and send the modulated signal via antenna segment(s) coupled to IC contacts 432/433. Modulator 446 may be implemented in any suitable way, for example using a switch, driver, amplifier, and other similar components. Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Protocol mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated protocol such as the Gen2 Protocol, for example including fewer or additional commands than the stated protocol calls for, and so on. In such instances, additional commands are sometimes called custom commands.

In some embodiments, the performance of a rectifier may be improved by biasing one or more rectifying elements in the rectifier. For example, if transistors are used as rectifying elements, direct current (DC) or non-time-varying biases may be applied to the gates of transistors to place the transistors into desired operating states.

Figure 6:
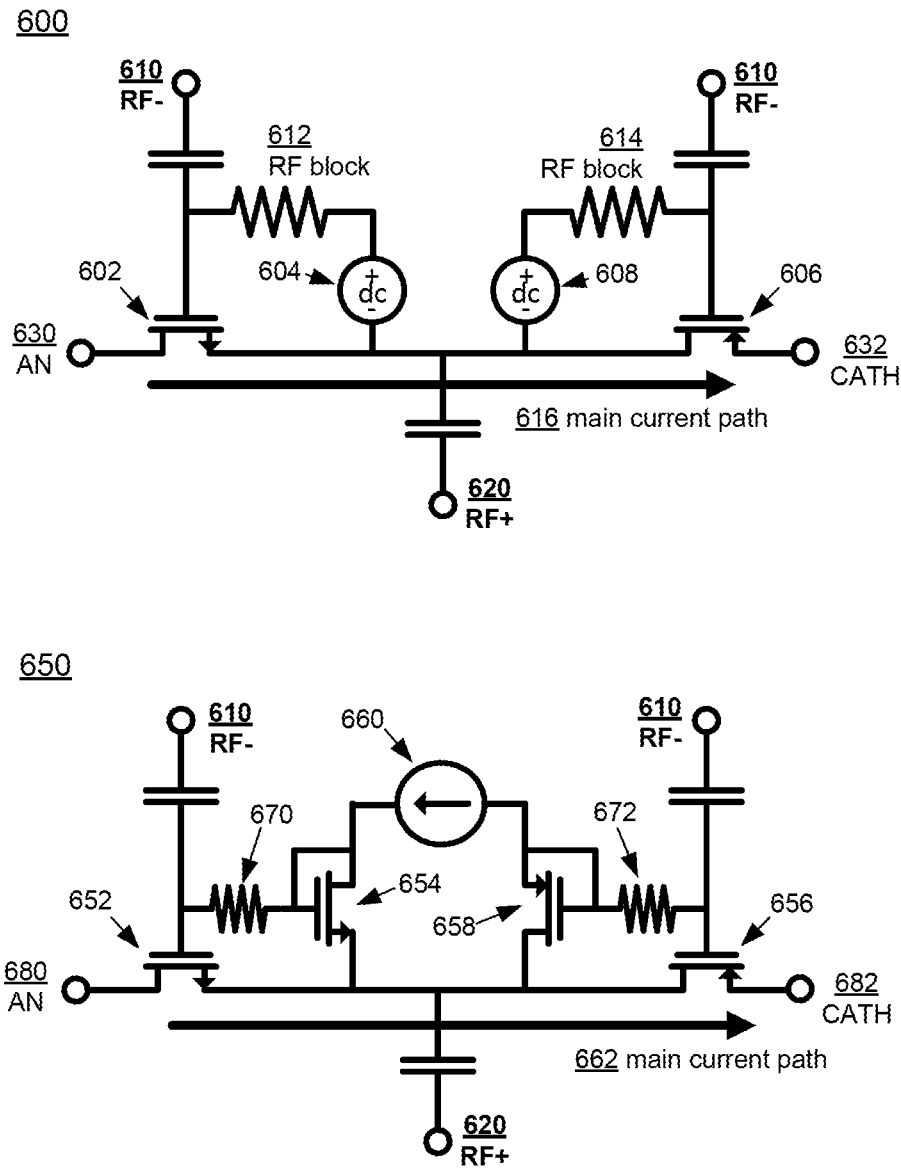
FIG. 6 illustrates the biasing of rectifier stages.

FIG. 6 illustrates the biasing of rectifier stages 600 and 650. Rectifier stage 600, which may be one of several stages in a rectifier, includes an n-channel metal-oxide semiconductor (NMOS) transistor 602 and a complementary p-channel metal-oxide semiconductor (PMOS) transistor 606, arranged to serve as rectifying elements along a main current path 616. The main current path 616 for rectifier stage 600 begins at anode 630, which is also the drain of transistor 602. The main current path 616 then passes through the source of transistor 602, which is coupled to an RF+ input 620 via a coupling capacitor and to the drain of transistor 606. The main current path 616 then passes through the source of transistor 606, which serves as cathode 632.

The gate of transistor 602 is coupled, via a coupling capacitor, to an RF− input 610, which has a different phase than RF+ input 620. The gate of transistor 602 is also coupled to DC bias 604 via RF block 612, which serves to isolate the RF signal originating at RF− input 610 from the DC signal provided by DC bias 604. The DC bias 604 is then coupled to the source of transistor 602.

The gate of transistor 606, like the gate of transistor 602, is also coupled to the RF− input 610 via a coupling capacitor. The gate of transistor 606 is further coupled to DC bias 608 via RF block 614, which serves to isolate the RF signal originating at RF− input 610 from the DC signal provided by DC bias 608. The DC bias 608 is then coupled to the drain of transistor 606.

In rectifier stage 650, biasing is provided via current flowing through biasing transistors. Rectifier stage 650, which may be one of several stages in a rectifier, includes NMOS transistor 652 and PMOS transistor 656, arranged to serve as rectifying elements along a main current path 662. The main current path 662 begins at anode 680, which is also the drain of transistor 652. The main current path 662 then passes through the source of transistor 652, which is coupled to the drain of transistor 656 and also to the RF+ input 620 via a coupling capacitor. The main current path 662 then passes through the source of transistor 656, which serves as cathode 682.

The gate of transistor 652 is coupled, via a coupling capacitor, to RF− input 610. A biasing NMOS transistor 654 is disposed between the gate and source of transistor 652, where the gate and source of biasing transistor 654 are coupled to the gate and source, respectively, of transistor 652. The gate of biasing transistor 654 is coupled to its drain and to the output of current source 660. This configuration causes biasing transistor 654 to provide a bias between the gate and source of transistor 652, where the bias value is based on the current provided by the current source 660. An RF block 670, similar to RF blocks 612 and 614, may isolate the RF signal originating at RF− input 610 from the bias provided by biasing transistor 654.

Transistor 656 is configured similarly to transistor 652. The gate of transistor 656 is coupled, via a coupling capacitor, to RF− input 610. A biasing PMOS transistor 658 is disposed between the gate and drain of transistor 656, where the gate and drain of biasing transistor 658 are coupled to the gate and drain, respectively, of transistor 656. The gate of biasing transistor 658 is coupled to its source and to the input of current source 660. This configuration causes biasing transistor 658 to provide a bias between the gate and drain of transistor 656, where the bias value is based on the current associated with the current source 660. An RF block 672, similar to RF blocks 612, 614, and 670, may isolate the RF signal originating at RF− input 610 from the bias provided by biasing transistor 658.

Figure 7:
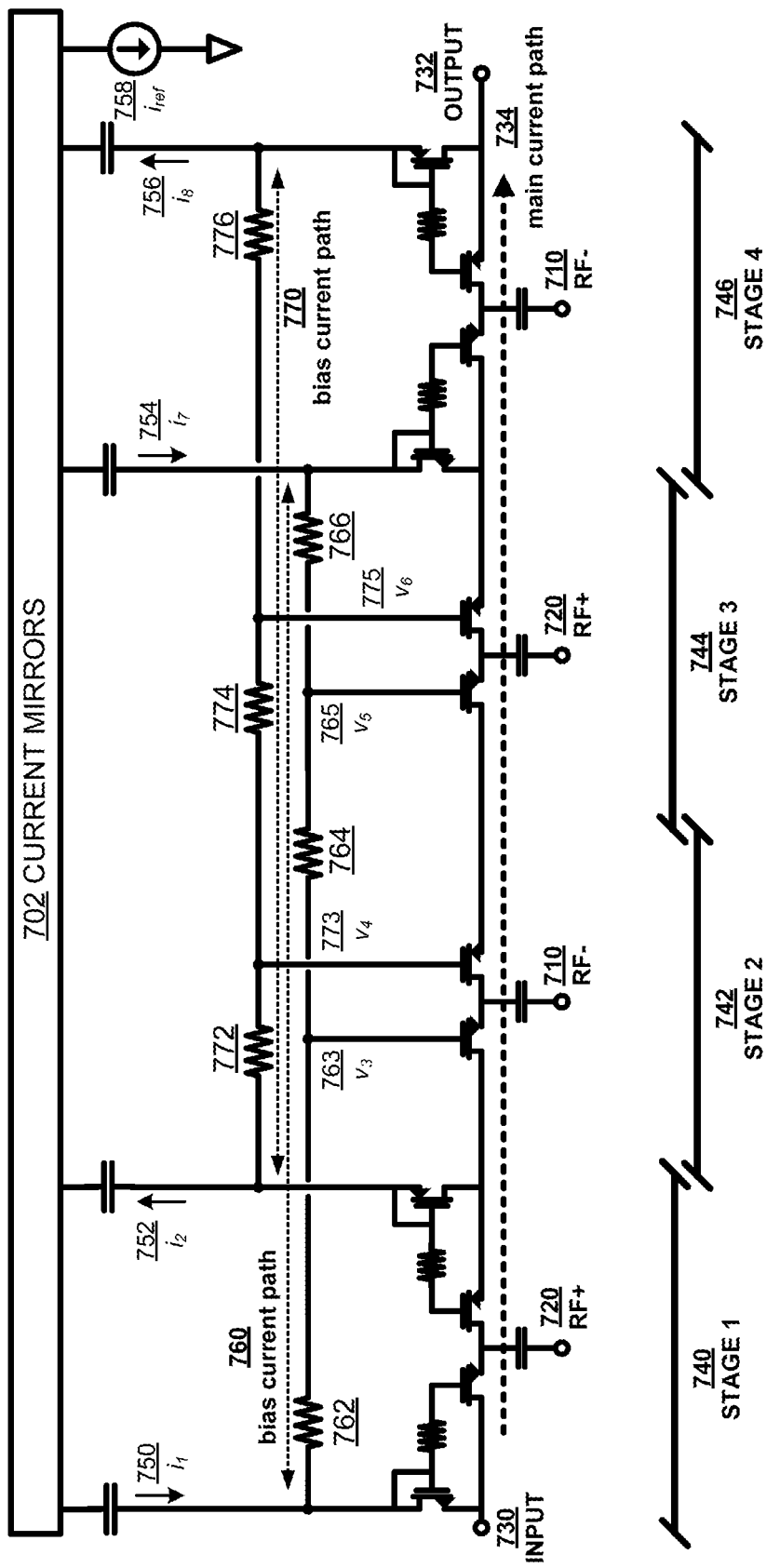
FIG. 7 depicts a central biasing scheme for a multi-stage rectifier involving current reuse, according to embodiments.

FIG. 7 depicts a central biasing scheme for a multi-stage rectifier 700 involving current reuse, according to embodiments. Rectifier biasing involving current reuse, as described in commonly-assigned and co-pending U.S. patent application Ser. No. 15/985,291 filed on May 21, 2018, hereby incorporated by reference in its entirety, can be used to reduce the number of biasing currents needed in a multi-stage rectifier. Multi-stage rectifier 700, similar to rectifier 700, includes four rectifier stages 740, 742, 744, and 746, serially coupled together to provide a main current path 734 from input 730 to output 732. However, the four rectifier stages 740-746 are biased only with four biasing currents 750, 752, 754, and 756, generated via current mirrors 702 from a reference current 758. This is accomplished by using bias currents to current-bias two rectifier stages (740 and 746) and reusing the bias currents to simultaneously voltage-bias the other two rectifier stages (742 and 744). Bias currents 750 and 752 are used to current-bias stage 740, while bias currents 754 and 756 are used to current-bias stage 746.

A first ladder of resistive elements 762, 764, and 766, arranged sequentially, couple bias currents 750 and 754, forming a bias current path 760 that allows current flow between bias currents 750 and 754. Current flow along bias current path 760 caused by differences between bias currents 750 and 754 provide bias voltages 763 (between elements 762 and 764) and 765 (between elements 764 and 766) for stages 742 and 744, respectively.

A second ladder of resistive elements 772, 774, and 776, arranged sequentially, couple bias currents 752 and 756, forming a bias current path 770 that allows current flow between bias currents 752 and 756. Current flow through bias current path 770 due to differences between bias currents 752 and 756 provide bias voltages 773 (between consecutive elements 772 and 774) and 775 (between consecutive elements 774 and 776) for stages 742 and 744, respectively.

The resistive elements 762-766 and 772-776 are selected such that the bias voltages between consecutive elements (e.g., bias voltages 763, 765, 773, and 775) are appropriately-sized to bias their corresponding rectifying elements. For example, the resistive elements may be selected such that the bias voltages track a corresponding voltage on the main current path 734. Accordingly, bias currents used to current-bias particular rectifier stages can be reused, via bias current paths created by resistive ladders with appropriately-chosen resistive elements, to voltage-bias multiple rectifier stages. In rectifier 700, bias current paths with three resistive elements each enable four bias currents to bias four rectifier stages via bias current reuse, but additional resistive elements can be added to enable biasing of additional rectifier stages.

Rectifier 700 is configured to convert an RF wave received on RF− and RF+ inputs 710 and 720 to a current flow along the main current path 734 from input 730 to output 734. The current flow then generates a DC voltage used to power IC components. When the RF wave has a low amplitude, the magnitude of signals on RF− and RF+ inputs 710 and 720 may also be low. This may cause a reverse current flow, also known as backflow, along the main current path 734 from output 732 to input 730. Such backflow degrades the power extraction efficiency of the rectifier and the sensitivity of the RFID IC.

Backflow in rectifiers can be reduced in a number of ways. For example, commonly-assigned U.S. Pat. No. 7,768,406 issued on Aug. 3, 2010 and hereby incorporated by reference in its entirety, describes several techniques for mitigating backflow in rectifiers. In some embodiments, backflow in a rectifier may be mitigated by adjusting the operation of the rectifier itself. For example, rectifying elements within the rectifier may be debiased such that they become substantially nonconductive and prevent significant current from passing through the main current path, thereby reducing backflow.

Figure 8:
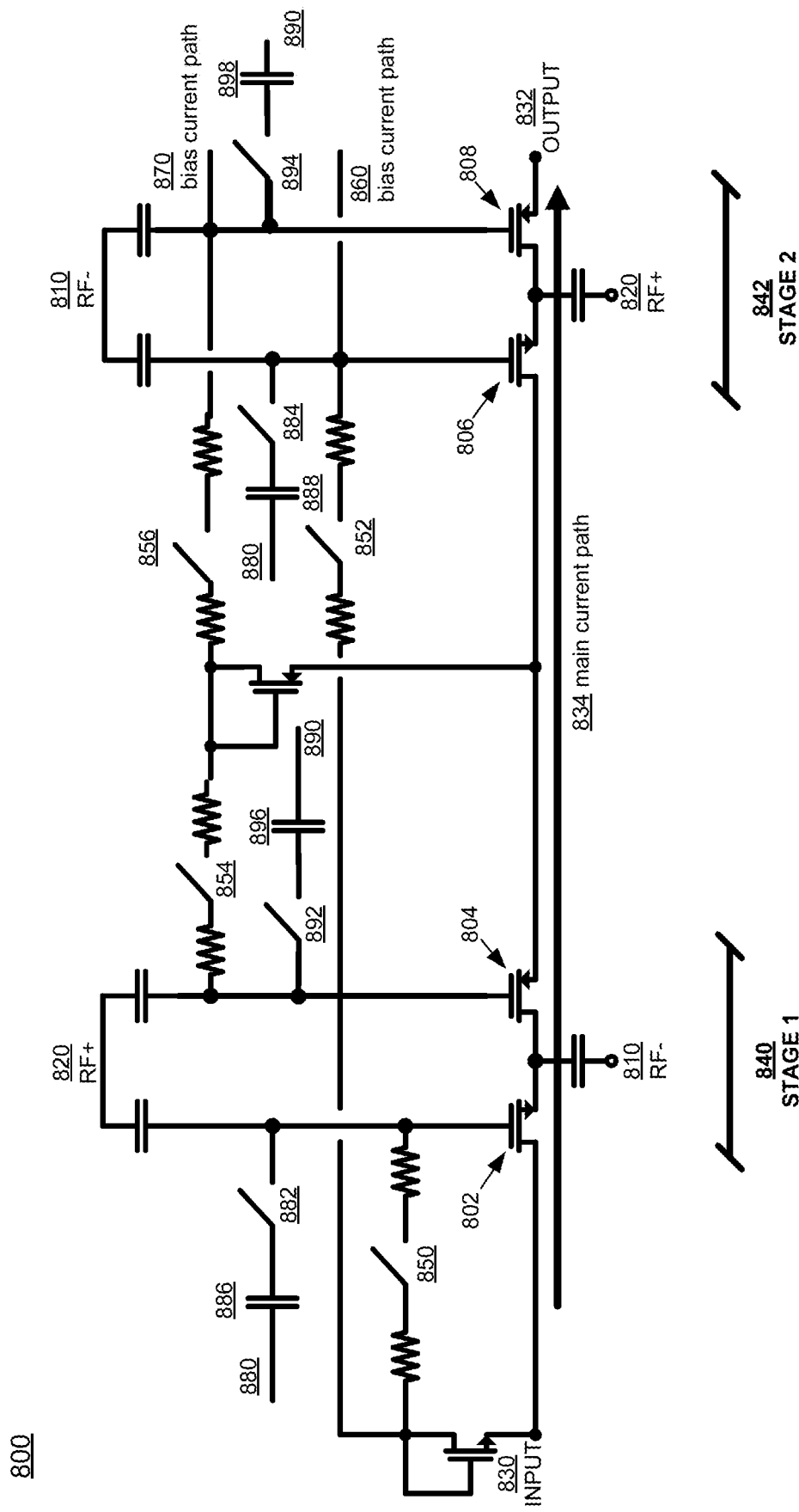
FIG. 8 depicts how a centrally-biased rectifier with current reuse can be debiased to reduce backflow.

FIG. 8 depicts how a centrally-biased rectifier with current reuse can be debiased to reduce backflow. Diagram 800 depicts two stages 840 and 842 of a multi-stage, centrally-biased rectifier with current reuse, similar to rectifier 700. Stages 840 and 842 are coupled together to provide a main current path 834 from an input 830 to an output 832. Rectifying elements 802 of stage 840 and 806 of stage 842 are voltage-biased by a current flowing on bias current path 860, whereas rectifying elements 804 of stage 840 and 808 of stage 842 are voltage-biased by a current flowing on bias current path 870.

Diagram 800 also depicts switches 850, 852, 854, and 856 disposed within bias current paths 860 and 870. When backflow is unlikely to occur, switches 850, 852, 854, and 856 may be closed, allowing bias currents to flow through bias current paths 860 and 870 and voltage-bias rectifying elements 802-808. When backflow is likely to occur (for example, when RF signals on RF− and RF+ inputs 810 and 820 have relatively low amplitude), switches 850-856 may be opened, thereby introducing breaks into and terminating current flow through bias current paths 860 and 870. Breaks may be introduced in bias current path 860 (for NMOS rectifying elements 802 and 806), bias current path 870 (for PMOS rectifying elements 804 and 808), or both bias current paths 860 and 870. The termination of current through bias current paths 860 and 870 terminates the voltage-biasing on rectifying elements 802-808. In the absence of voltage-biasing, rectifying elements 802-808 may no longer conduct, thereby introducing breaks into main current path 834 between consecutive RF− and RF+ inputs. Accordingly, backflow between consecutive RF− and RF+ inputs is reduced if not eliminated.

When switches 850-856 are open, rectifying elements 802-808 are not voltage-biased from current on bias current paths 860 and 870. If the biasing terminals of rectifying elements 802-808 (in this case, their gates) are not connected to any potential, they may float. In some circumstances this may allow rectifying elements 802-808 to at least partially conduct and thereby result in backflow.

While in diagram 800 each bias current path has multiple switches (for example, bias current path 860 has switches 850 and 852 and bias current path 870 has switches 854 and 856), in some embodiments a bias current path may only have a single switch. Opening the single switch may be sufficient to terminate the biasing for multiple or all of the rectifying elements coupled to that bias current path.

In some embodiments debiasing voltages may be supplied to one or more rectifying elements in the absence of other voltage-biasing to ensure debiasing. For example, debiasing voltage 880, coupled through switches 882 and 884, may be supplied to rectifying elements 802 and 806, while debiasing voltage 890, coupled through switches 892 and 894, may be supplied to rectifying elements 804 and 808. Debiasing voltages 880 and 890 may have any values suitable for debiasing their respective rectifying elements such that they no longer allow currents to pass. For example, debiasing voltage 880 may be a near-zero voltage or a voltage based on the source and/or drain voltages of rectifying elements 802 and/or 806. Debiasing voltage 890 may be a relatively high (in other words, not near-zero) voltage or a voltage based on the source and/or drain voltages of rectifying elements 804 and/or 808. Debiasing voltages 880/890 may be static or dynamic. When rectifying elements 802-808 are voltage-biased by current flowing through bias current paths 860 and 870, switches 882, 884, 892, and 894 may be open, thereby isolating debiasing voltages 880/890 from rectifying elements 802-808. After or when current flow through bias current paths 860 and 870 is interrupted (for example, due to switches 850-856 opening) to debias rectifying elements 802-808, switches 882, 884, 892, and 894 may close, voltage-biasing the rectifying elements 802-808 with debiasing voltages 880/890 and ensuring that rectifying elements 802-808 are debiased.

In some embodiments, different rectifying elements or rectifying elements in different rectifier stages may be biased using different voltage values. For example, rectifying element 802 (in stage 1 840) may be biased using a first voltage value while rectifying element 806 (in stage 2 842) may be biased using a second voltage value different from the first voltage value. During debiasing, it may be desirable to debias both rectifying elements 802 and 806 the same amount relative to their biasing. This may result in having to generate multiple, different debiasing voltages.

To facilitate generating different debiasing voltages, rectifying element bias voltages can be individually captured or sampled and combined with another voltage corresponding to the amount of desired debiasing. This allows the same voltage to be used to debias multiple stages. Diagram 800 depicts capacitances 886, 888, 896, and 898 that couple debiasing voltages 880 and 890 to rectifying elements. The capacitances 886, 888, 896, and 898 (also referred-to as "bias-sampling capacitances") can be used to store the voltages used to bias rectifying elements 802, 806, 804, and 808, respectively.

For example, when rectifying elements 802-808 are normally biased (in other words, not debiased), the terminals coupled to debiasing voltages 880/890 may be switched to a reference potential such that capacitances 886, 888, 896, and 898 store or sample the bias voltages of their respective rectifying elements. When rectifying elements 802-808 are then debiased, each rectifying element can be provided with a individualized debiasing voltage formed from a combination of debiasing voltage 880/890 and their respective, sampled bias voltage (stored on its respective bias-sampling capacitance).

In diagram 800, debiasing voltages are supplied to all the rectifying elements 802-808. However, in some embodiments debiasing voltages may only be supplied to a subset of the rectifying elements. For example, backflow may be prevented by only debiasing one rectifying element between each consecutive pair of RF inputs. In some embodiments, different debiasing voltages may be supplied to rectifying elements of the same type (e.g., NMOS or PMOS). For example, different debiasing voltages may be supplied to rectifying element 802 and rectifying element 806.

The opening and closing of switches 850-856, 882-884, and 892-894 are controlled by an IC controller, which can also be referred-to as a processor or processor block. The IC controller may be implemented in rectifier & PMU 441, processing block 444, other control circuitry in the IC, or using a combination of some or all of the previous. The IC controller is configured to determine when backflow may occur. Backflow may be more prevalent when an incident RF wave received on RF inputs (e.g., RF− input 810 and RF+ input 820) has a relatively low amplitude. Accordingly, the IC controller may be configured to measure the amplitude of an incident RF wave. In one embodiment, the IC controller determines and measures the amplitude-modulated (AM) envelope of the RF wave incident on the RF inputs.

Figure 9:
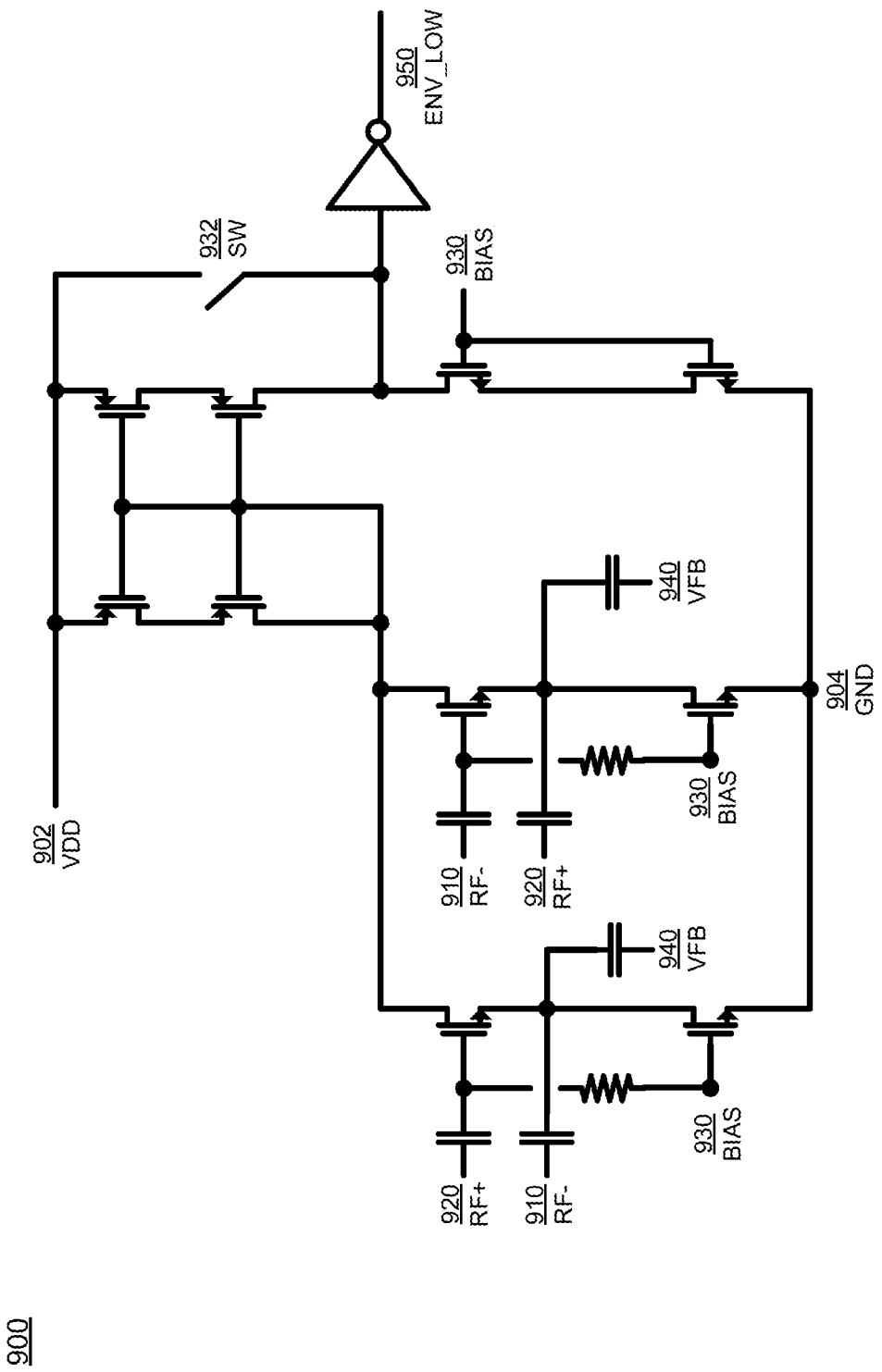
FIG. 9 depicts an example circuit used to determine when a rectifier should be debiased to reduce backflow.

FIG. 9 depicts an example circuit 900 used to determine when a rectifier should be debiased to reduce backflow. Circuit 900 implements a current-starved common-gate, common-source amplifier that can be used for AM demodulation. Circuit 900 is powered by voltage VDD 902 and also coupled to ground GND 904. BIAS signal 930, VFB signal 940, and switch SW 932 ensure that circuit 900 is in the proper operating state upon power-up. RF− inputs 910 and RF+ inputs 920 receive an incident RF wave. When the envelope of the incident RF wave is low, the output signal ENV_LOW 950 is high. Accordingly, when the output signal ENV_LOW 950 is high, backflow may be more likely. The IC controller may then use the output signal ENV_LOW 950 to control when rectifier debiasing is to occur.

The IC controller may also (or instead) use preexisting circuits and modules on the IC to determine when the envelope of an RF signal is low. For example, demodulator 442 may include an envelope detector, and the IC controller may use the envelope detector to identify periods of low RF signal envelope, corresponding to a higher likelihood of backflow.

When the IC controller determines that backflow likelihood is relatively high, the IC controller may cause rectifying element(s) in the rectifier to be debiased. For example, if the IC controller determines that incident RF wave amplitude is below a certain threshold (a "backflow threshold"), then the IC controller can determine that backflow likelihood is relatively high and cause rectifying element(s) to be debiased, as described above. Subsequently, if the IC controller then determines that incident RF wave amplitude is above the backflow threshold, then the IC controller can determine that backflow likelihood is relatively low and cause the debiasing of rectifying element(s) to be reversed. Reversing the debiasing of rectifying element(s) can be the opposite of the debiasing processes described above.

Backflow may also occur when a modulator of the IC is modulating an incident RF wave to backscatter a signal. In this situation, the IC controller may use a signal to or from the modulator to determine when rectifier debiasing or debiasing reversal is to occur. For example, if the modulator shorts RF inputs to the IC during backscatter, the value of the signal used to short the RF inputs may be used to debias and/or reverse the debiasing of rectifying elements in the rectifier.

Rectifier debiasing to reduce backflow may be performed in a digital or analog manner. When backflow is not likely (for example, RF signal envelope is high), the IC controller biases rectifying elements with a first bias suitable for rectifier operation. When operating in a digital manner, if backflow is likely then the IC controller may disconnect rectifying elements from the first bias and/or provide a second bias that causes the rectifying elements to become nonconductive. When operating in an analog manner, the IC controller may bias rectifying elements with a bias whose value is related to the likelihood of backflow. For example, when backflow is not likely the IC controller may bias rectifying elements with a relatively high bias. As the likelihood of backflow increases (for example, as the RF signal envelope decreases), the IC controller may reduce the bias provided to the rectifying elements. Accordingly, as backflow becomes more likely, the rectifying elements become more debiased, thereby reducing the chance that backflow will actually occur; by making rectifying elements less conductive.

Figure 10:
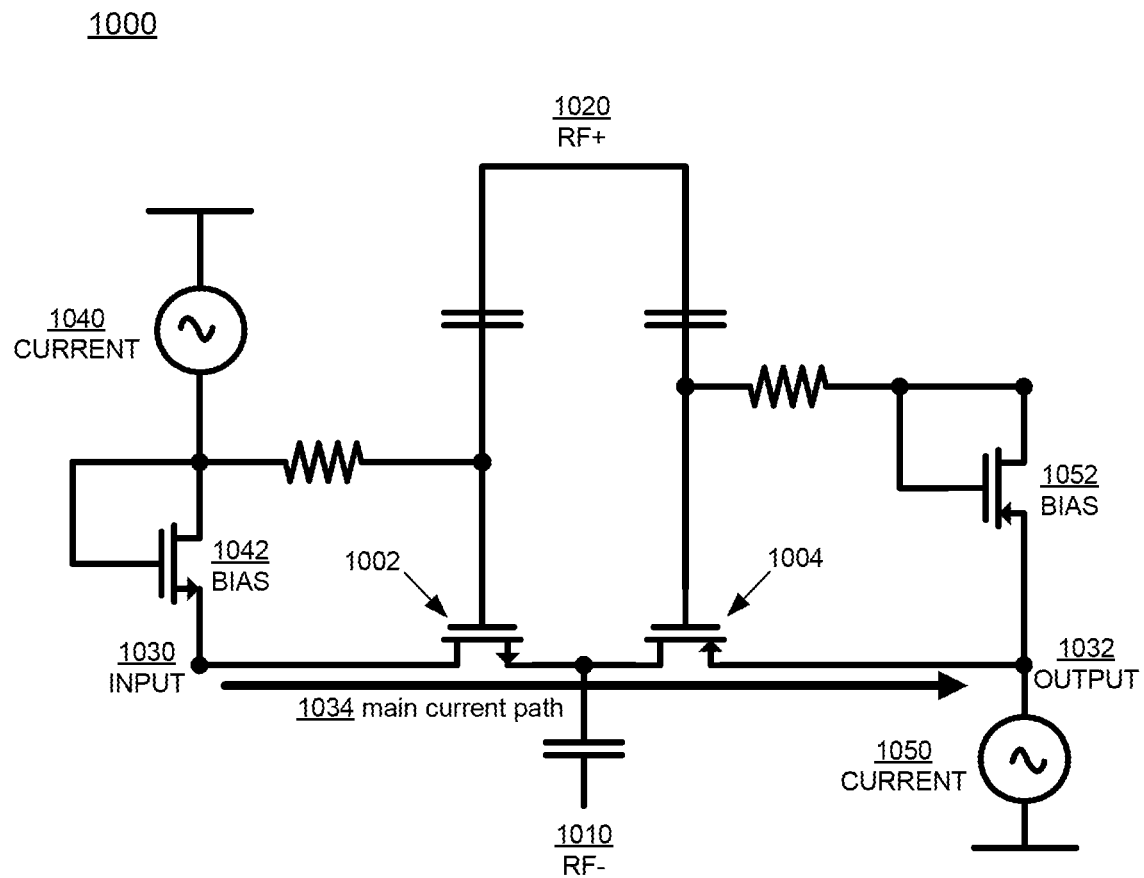
FIG. 10 depicts an example analog scheme for debiasing a rectifier to reduce backflow.

FIG. 10 depicts an example analog scheme for debiasing a rectifier to reduce backflow. Diagram 1000 depicts a single rectifier stage. An incident RF wave is coupled via RF− input 1010 and RF+ input 1020, and rectifying elements 1002 and 1004 operate to generate a current flow from input 1030 to output 1032 via main current path 1034. Rectifying elements 1002 and 1004 are biased via biasing elements 1042 and 1052, which are coupled to current source 1040 and current sink 1050, respectively. Current source 1040 and current sink 1050 provide currents that are proportional to the detected RF signal envelope. Accordingly, the biasing elements 1042 and 1052 provide biases to rectifying elements 1002 and 1004 that are also proportional to the detected RF signal envelope. When the magnitude of rectifying element biasing is tied to RF signal envelope amplitude as described, the IC controller may not need to explicitly determine the backflow likelihood, because the biasing is automatically adjusted based on RF signal envelope amplitude without needing explicit instructions from the IC controller.

Of course, in other schemes any suitable digital or analog scheme for adjusting rectifier bias than those described above may be used. In addition, backflow reduction via rectifier biasing as described above can be used for rectifiers that are not centrally biased.

According to one example, a Radio Frequency Identification (RFID) integrated circuit (IC) is provided. The RFID IC includes an input node configured to receive an RF signal, a rectifier for rectifying the RF signal and including multiple serially coupled rectifying elements defining a main current path, and a processing block. The processor block is configured to determine RF signal amplitudes and provide a debiasing voltage to debias at least one of the rectifying elements when a first amplitude of the RF signal indicates that rectifier backflow along the main current path is likely, thereby reducing a conductivity of the at least one rectifying element. The processor block is further configured to subsequently reverse the debiasing of the at least one rectifying element when a second amplitude of the RF signal indicates that backflow along the main current path is no longer likely.

According to another example, a Radio Frequency Identification (RFID) integrated circuit (IC) is provided. The RFID IC includes a rectifier configured to extract power from an incident RF signal, an envelope detector configured to determine incident RF signal amplitudes, and a processor block. The processor block is configured to receive a first RF signal amplitude from the envelope detector, determine that the first RF signal amplitude is below a backflow threshold, and in response debias at least one rectifying element in the rectifier to decrease a conductivity of the at least one rectifying element, thereby reducing backflow in the rectifier. The processor block is further configured to, subsequently, receive a second RF signal amplitude from the envelope detector, determine that the second RF signal amplitude is above the backflow threshold, and in response reverse the debiasing of the at least one rectifying element in the rectifier to increase the conductivity of the at least one rectifying element.

According to some embodiments, the RFID IC may include an envelope detector and/or a current-starved common-gate, common-source amplifier, where the processor block is configured to determine the amplitude from the envelope detector or the amplifier. The RFID IC may include a demodulator having the envelope detector. The processor block may be configured to provide the debiasing voltage to the rectifying element(s) by disconnecting a bias voltage from the rectifying element(s). The processor block may be configured to disconnect the bias voltage by causing a break in a resistive ladder structure configured to provide bias voltages to multiple rectifying elements in the rectifier, and may debias multiple rectifying elements by causing the break.

According to some embodiments, the processor block may be configured to debias the rectifying element(s) by coupling a debiasing voltage to the rectifying element(s). The debiasing voltage may be proportional to the first RF signal amplitude, and the processor block may be configured to reverse the debiasing of the rectifying element(s) by coupling a bias voltage proportional to the second RF signal amplitude to the rectifying element(s).

According to some embodiments, the RFID IC may include a bias-sampling capacitance coupled to the rectifying element(s), and the processor block may be configured to form the debiasing voltage by causing the bias-sampling capacitance to sample a bias voltage of the rectifying element(s) and combining the sampled bias voltage with another voltage to form the debiasing voltage. In some embodiments, the rectifier may include first and second rectifying elements having first and second bias-sampling capacitances and differing first and second bias voltages, respectively. The processor block may be configured to debias the first and second rectifying elements by causing the first and second bias-sampling capacitances to sample the first and second bias voltages, respectively; forming first and second debiasing voltages for the first and second rectifying elements, respectively, by combining the sampled first and second bias voltages with substantially the same voltage; and coupling the first and second debiasing voltages to the first and second rectifying elements, respectively.

According to a further example, a method to reduce backflow in a Radio Frequency Identification (RFID) integrated circuit (IC) rectifier is provided. The method includes determining that a first value of an incident RF wave amplitude is below a threshold and in response debiasing at least one rectifying element in the rectifier to reduce a conductivity of the rectifying element, thereby reducing backflow in the rectifier while the RF wave amplitude is below the threshold. The method further includes subsequently determining that a second value of the RF wave amplitude is above the threshold and in response reversing the debiasing of the at least one rectifying element to increase the conductivity of the rectifying element.

According to some embodiments, the method may include determining the RF wave amplitude using an envelope detector or a current-starved common-gate, common-source amplifier. Debiasing the rectifying element(s) may include disconnecting a bias voltage from the rectifying element(s). Disconnecting the bias voltage may include causing a break in a resistive ladder structure configured to provide bias voltages to multiple rectifying elements in the rectifier, and the method may further include debiasing multiple rectifying elements by causing the break.

According to some embodiments, debiasing the rectifying element(s) may include sampling differing first and second bias voltages of first and second rectifying elements, respectively, in the rectifier; forming a first debiasing voltage for the first rectifying element by combining the sampled first bias voltage with a third voltage; forming a second debiasing voltage for the second rectifying element by combining the sampled second bias voltage with the third voltage; and coupling the first and second debiasing voltages to the first and second rectifying elements, respectively.

According to some embodiments, debiasing the rectifying element(s) may include coupling a debiasing voltage proportional to the first value to the rectifying element(s). Reversing the debiasing of the rectifying element(s) may include coupling a bias voltage proportional to the second value to the rectifying element(s).

As mentioned previously, embodiments are directed to reducing backflow via rectifier debiasing. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. Information represented by the states of these quantities may be referred-to as bits, data bits, samples, values, symbols, characters, terms, numbers, or the like. However, these and similar terms are associated with and merely convenient labels applied to the appropriate physical quantities, individually or in groups.

Embodiments furthermore include storage media. Such media, individually or in combination with others, have stored thereon instructions, data, keys, signatures, and other data of a program made according to the embodiments. A storage medium according to embodiments is a computer-readable medium, such as a memory, and can be read by a processor of the type mentioned above. If a memory, it can be implemented in any of the ways and using any of the technologies described above.

Even though it is said that a program may be stored in a computer-readable medium, it does not need to be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) integrated circuit (IC) comprising:
    an input node configured to receive an RF signal;
    a rectifier for rectifying the RF signal and including a plurality of serially coupled rectifying elements defining a main current path; and
    a processor block configured to:
        determine RF signal amplitudes;
        when a first amplitude of the RF signal indicates that rectifier backflow along the main current path is likely, couple a debiasing voltage to at least a first one of the rectifying elements to reduce a bias of the first rectifying element, thereby reducing a conductivity of the first rectifying element; and
        subsequently, when a second amplitude of the RF signal indicates that backflow along the main current path is no longer likely, isolate the debiasing of the at least one rectifying element.

2. The RFID IC of claim 1, further comprising at least one of:
    an envelope detector; and
    a current-starved common-gate, common-source amplifier, wherein the processor block is configured to determine the amplitude from one of the envelope detector and the amplifier.

3. The RFID IC of claim 1, wherein the processor block is further configured to;
    reduce the bias of the first rectifying element by causing a break in a resistive ladder structure configured to provide bias voltages to the at least one plurality of rectifying element elements in the rectifier; and
    reduce the biases of the plurality of rectifying elements by causing the break.

4. The RFID IC of claim 1, wherein:
    the debiasing voltage is proportional to the first amplitude; and
    the processor block is configured to reverse the debiasing of the first rectifying element by coupling a bias voltage proportional to the second amplitude to the first rectifying element.

5. The RFID IC of claim 1, further comprising a bias-sampling capacitance coupled to the at least one rectifying element, wherein the processor block is further configured to:

use the bias-sampling capacitance to combine a first bias voltage of the first rectifying element with the debiasing voltage to reduce the bias of the first rectifying element.

6. The RFID IC of claim 1, wherein:
the plurality of rectifying elements includes the first rectifying element and a second rectifying element associated with first and second bias-sampling capacitances, respectively;
the first and second rectifying elements have differing first and second bias voltages; and
the processor block is configured to:
use the first bias-sampling capacitor to combine the first bias voltage with the debiasing to reduce the bias of the first rectifying element; and
use the second bias-sampling capacitance to combine the second bias voltage with the debiasing voltage to reduce a bias of the second rectifying element.

7. A Radio Frequency Identification (RFID) integrated circuit (IC) comprising:
a rectifier including at least a first rectifying element, the rectifier configured to extract power from an incident RF signal;
an envelope detector configured to determine incident RF signal amplitudes; and
a processor block configured to:
receive a first RF signal amplitude from the envelope detector;
determine that the first RF signal amplitude is below a backflow threshold, and in response couple a debiasing voltage to at least the first rectifying element to reduce a bias of the first rectifying element, thereby reducing a conductivity of the first rectifying element and reducing backflow in the rectifier;
subsequently, receive a second RF signal amplitude from the envelope detector; and
determine that the second RF signal amplitude is above the backflow threshold, and in response isolate the debiasing voltage from the first rectifying element to increase the conductivity of the first rectifying element.

8. The RFID IC of claim 7, further comprising a demodulator that includes the envelope detector.

9. The RFID IC of claim 7, wherein the processor block is configured to reduce the bias of the first rectifying element by disconnecting a bias voltage from the first rectifying element.

10. The RFID IC of claim 9, wherein the processor block is configured to:
disconnect the bias voltage by causing a break in a resistive ladder structure configured to provide bias voltages to a plurality of rectifying elements in the rectifier; and
reduce biases of the plurality of rectifying elements by causing the break.

11. The RFID IC of claim 7, wherein:
the rectifier further includes a second rectifying element;
the first and second rectifying elements are associated with first and second bias-sampling capacitances, respectively;
the first and second rectifying elements have differing first and second bias voltages; and
the processor block is configured to:
use the first bias-sampling capacitance to combine the first bias voltage with the debiasing voltage to reduce a bias of the first rectifying element; and
use the second bias-sampling capacitance to combine the second bias voltage with the debiasing voltage to reduce a bias of the second rectifying element.

12. The RFID IC of claim 7, wherein
the debiasing voltage is proportional to the first RF signal amplitude; and
the processor is further configured to increase the conductivity of the first rectifying element by coupling a bias voltage proportional to the second RF signal amplitude to the first rectifying element.

13. A method to reduce backflow in a Radio Frequency Identification (RFID) integrated circuit (IC) rectifier, the method comprising:
determining that a first value of an incident RF wave amplitude is below a threshold, and in response coupling a debiasing voltage to at least a first rectifying element in the rectifier to decrease a bias of the first rectifying element, thereby reducing a conductivity of the rectifying element and reducing backflow in the rectifier while the RF wave amplitude is below the threshold; and
subsequently, determining that a second value of the RF wave amplitude is above the threshold, and in response isolating the debiasing voltage from the at least first rectifying element to increase the conductivity of the first rectifying element.

14. The method of claim 13, further comprising determining the RF wave amplitude using one of an envelope detector in the IC and a current-starved common-gate, common-source amplifier in the IC.

15. The method of claim 13, wherein decreasing the bias of the first rectifying element further comprises disconnecting a bias voltage from the first rectifying element.

16. The method of claim 15, wherein disconnecting the bias voltage comprises causing a break in a resistive ladder structure configured to provide bias voltages to a plurality of rectifying elements in the rectifier, the method further comprising decreasing biases of the plurality of rectifying elements by causing the break.

17. The method of claim 13, further comprising:
sampling differing first and second bias voltages of first and second rectifying elements, respectively, in the rectifier;
reducing the bias of the first rectifying element using a combination formed from the sampled first bias voltage and the debiasing voltage;
reducing a bias of the second rectifying element using a combination formed from the sampled second bias voltage and the debiasing voltage.

18. The method of claim 13, wherein:
the debiasing voltage is proportional to the first value; and
increasing the conductivity of the first rectifying element comprises coupling a bias voltage proportional to the second value to the first rectifying element.

* * * * *

UNITED STATES PATENT AND TRADEMARK OFFICE
CERTIFICATE OF CORRECTION

PATENT NO. : 11,188,803 B1
APPLICATION NO. : 16/810892
DATED : November 30, 2021
INVENTOR(S) : Amita Patil et al.

It is certified that error appears in the above-identified patent and that said Letters Patent is hereby corrected as shown below:

In the Specification

In Column 2, Line 1, Delete "Turk" and insert -- Turk, --.

In the Claims

In Column 18, Line 50, In Claim 3, delete "to;" and insert -- to: --.
In Column 18, Line 54, In Claim 3, delete "element elements" and insert -- elements --.

Signed and Sealed this
Twentieth Day of September, 2022

*Katherine Kelly Vidal*

Katherine Kelly Vidal
*Director of the United States Patent and Trademark Office*